(12) United States Patent
Lin et al.

(10) Patent No.: US 10,683,596 B2
(45) Date of Patent: Jun. 16, 2020

(54) METHOD OF GENERATING AN IMAGE THAT SHOWS AN EMBROIDERY AREA IN AN EMBROIDERY FRAME FOR COMPUTERIZED MACHINE EMBROIDERY

(71) Applicant: ZENG HSING INDUSTRIAL CO., LTD., Taichung (TW)

(72) Inventors: Zheng-Hau Lin, Taichung (TW); Kun-Lung Hsu, Taichung (TW)

(73) Assignee: ZENG HSING INDUSTRIAL CO., LTD., Taichung (TW)

( * ) Notice: Subject to any disclaimer, the term of this patent is extended or adjusted under 35 U.S.C. 154(b) by 190 days.

(21) Appl. No.: 16/002,348

(22) Filed: Jun. 7, 2018

(65) Prior Publication Data

US 2019/0376221 A1    Dec. 12, 2019

(51) Int. Cl.
| | |
|---|---|
| *D05C 13/02* | (2006.01) |
| *G06T 5/00* | (2006.01) |
| *G06T 7/62* | (2017.01) |
| *D05C 9/06* | (2006.01) |
| *D05B 19/12* | (2006.01) |
| *D05C 9/22* | (2006.01) |
| *D05C 5/02* | (2006.01) |
| *D05C 3/02* | (2006.01) |

(52) U.S. Cl.
CPC ............. *D05C 13/02* (2013.01); *D05B 19/12* (2013.01); *D05C 5/02* (2013.01); *D05C 9/06* (2013.01); *D05C 9/22* (2013.01); *G06T 5/006* (2013.01); *G06T 7/62* (2017.01); *D05C 3/02* (2013.01); *D05D 2207/00* (2013.01); *D05D 2305/32* (2013.01); *G06T 2207/10004* (2013.01); *G06T 2207/30124* (2013.01)

(58) Field of Classification Search
None
See application file for complete search history.

(56) References Cited

U.S. PATENT DOCUMENTS

| | | | | |
|---|---|---|---|---|
| 2004/0170315 | A1* | 9/2004 | Kosaka | .................... G06T 5/006 382/154 |
| 2009/0188414 | A1* | 7/2009 | Tokura | .................... D05B 19/10 112/457 |
| 2009/0188415 | A1* | 7/2009 | Tokura | .................... D05B 19/10 112/470.01 |
| 2014/0083345 | A1* | 3/2014 | Tokura | .................... D05B 19/08 112/470.01 |
| 2014/0098245 | A1* | 4/2014 | Powell | .................... G06T 5/003 348/207.1 |

(Continued)

*Primary Examiner* — Gandhi Thirugnanam
(74) *Attorney, Agent, or Firm* — Birch, Stewart, Kolasch & Birch, LLP

(57) ABSTRACT

A method of generating an image that shows an embroidery area in an embroidery frame for computerized embroidery includes: acquiring a first image of a calibration board that has multiple feature points forming a contour approximating an embroidery area defined by the embroidery frame; identifying the feature points of the calibration board in the first image to acquire multiple graphical feature points; acquiring a geometric curved surface that fits the graphical feature points and that includes multiple curved surface points; acquiring a second image in which the embroidery area of the embroidery frame is shown; and performing image correction on the second image based on the geometric curved surface to generate a corrected image.

8 Claims, 22 Drawing Sheets

(56) References Cited

U.S. PATENT DOCUMENTS

| | | | | |
|---|---|---|---|---|
| 2015/0369593 | A1* | 12/2015 | Myllykoski | G06T 7/73 |
| | | | | 348/136 |
| 2017/0262967 | A1* | 9/2017 | Russell | G06T 5/006 |
| 2017/0306541 | A1* | 10/2017 | Kongo | D05B 19/08 |
| 2018/0144502 | A1* | 5/2018 | Wakai | H04N 17/002 |
| 2018/0150047 | A1* | 5/2018 | Shapiro | G05B 19/19 |
| 2019/0376219 | A1* | 12/2019 | Hsu | D05B 35/066 |
| 2019/0376221 | A1* | 12/2019 | Lin | D05B 19/12 |
| 2019/0378251 | A1* | 12/2019 | Hsu | G06T 5/50 |

* cited by examiner

METHOD OF GENERATING AN IMAGE THAT SHOWS AN EMBROIDERY AREA IN AN EMBROIDERY FRAME FOR COMPUTERIZED MACHINE EMBROIDERY

FIELD

The disclosure concerns a method related to embroidery, and more particularly to a method of generating an image that shows an embroidery area in an embroidery frame for computerized machine embroidery.

BACKGROUND

A conventional computerized embroidery machine is provided with an editing program for a user to arrange embroidery objects using images, so that the computerized embroidery machine can automatically embroider the embroidery objects onto a base fabric piece that is framed in an embroidery frame. As an example, FIG. 1 exemplifies an editing program 1 that supports an embroidery frame defining an embroidery area of 50 mm×70 mm or 140 mm×180 mm. Further referring to FIGS. 2 and 3, when the user uses an embroidery frame 21 defining an embroidery area 211 of 140 mm×180 mm, the editing program 1 may provide a graphical editing interface 11 with a width-to-length ratio of 7:9 (140:180) that corresponds to the embroidery area 211 defined by the embroidery frame 21. The user may operate the editing program 1 to place an image of the desired embroidery object 3 at a desired location in the graphical editing interface 11, which corresponds to a desired location with respect to the embroidery frame 21, so that the computerized embroidery machine may automatically embroider the desired embroidery object 3 at the desired location of the base fabric piece 22 in the embroidery frame 21 according to the arrangement in the graphical editing interface 11, as shown in FIG. 4.

However, such method is only suitable when the base fabric piece has no background pattern or the user does not care about the positioning of the embroidery object relative to the patterns of the base fabric piece.

SUMMARY

Therefore, an object of the disclosure is to provide a method that facilitates a user of computerized machine embroidery to arrange an embroidery object at a desired location on a base fabric piece that has a pattern.

According to the disclosure, the method for generating an image that shows an embroidery area in an embroidery frame for computerized embroidery is proposed to include: acquiring a first image of a calibration board, the calibration board having a plurality of feature points that form a contour approximating an embroidery area defined by the embroidery frame; identifying the feature points of the calibration board in the first image to acquire a plurality of graphical feature points; calculating a plurality of control parameters based on the graphical feature points, the control parameters cooperatively defining a geometric curved surface that fits the graphical feature points and that includes a plurality of curved surface points; acquiring a second image in which the embroidery area defined by the embroidery frame is shown and which includes a plurality of image pixels; and performing image correction on the second image based on the geometric curved surface to generate a corrected image. The corrected image corresponds to the embroidery area defined by the embroidery frame, and includes a plurality of pixels respectively corresponding to the curved surface points of the geometric curved surface. For each of the pixels of the corrected image, a pixel value thereof is calculated based on at least one of the image pixels of the second image that is adjacent to a position corresponding to one of the curved surface points which corresponds to the pixel of the corrected image.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
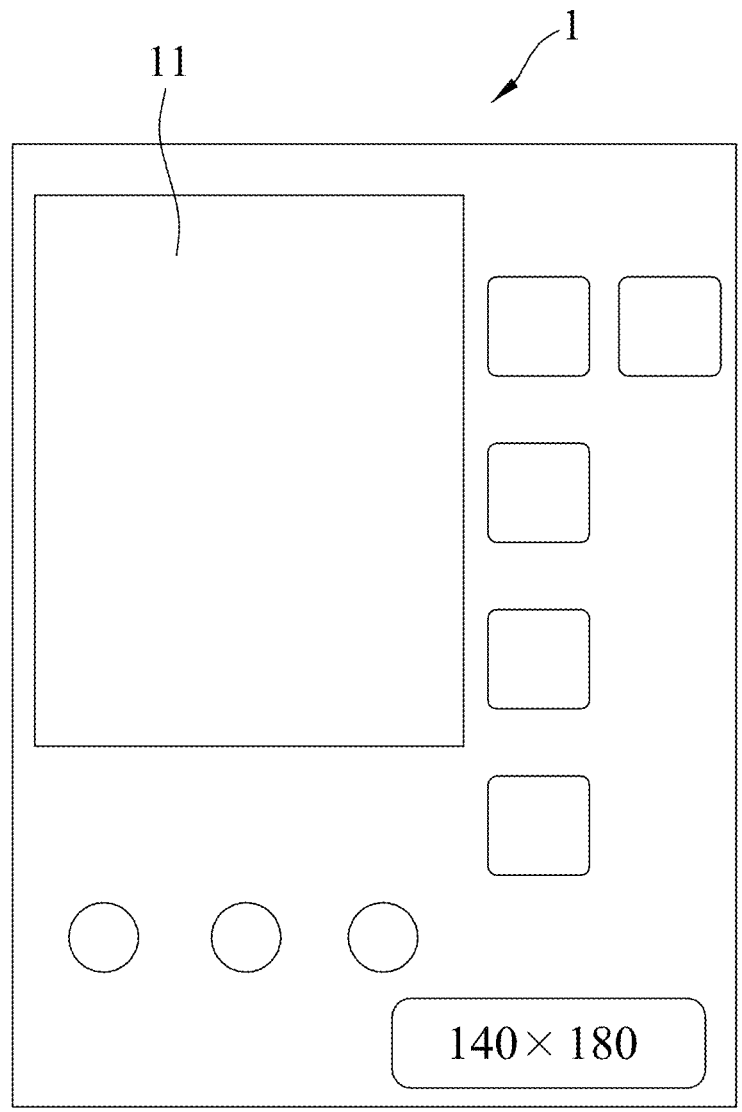
FIG. 1 is a schematic diagram illustrating a conventional editing program for computerized machine embroidery.
Figure 2:
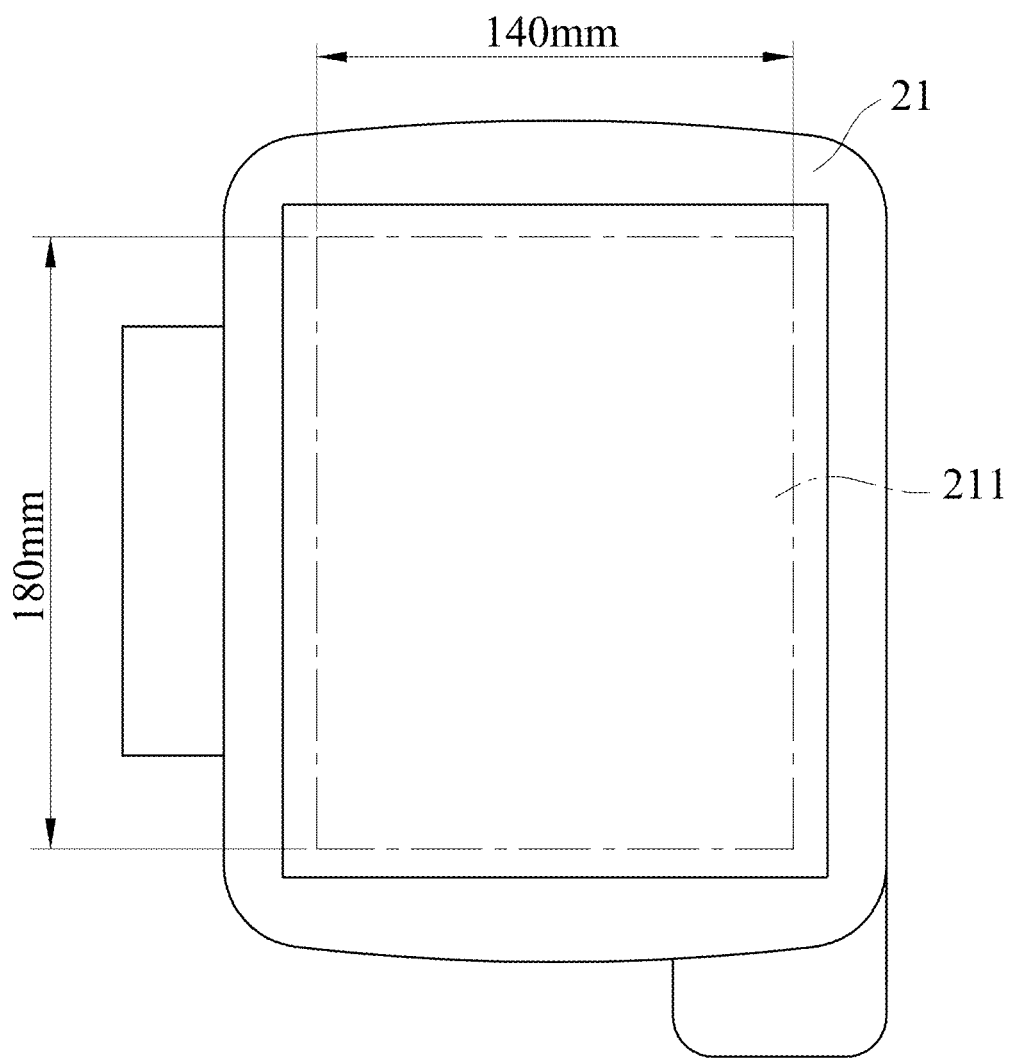
FIG. 2 is a schematic diagram illustrating an embroidery frame and an embroidery area defined thereby.
Figure 3:
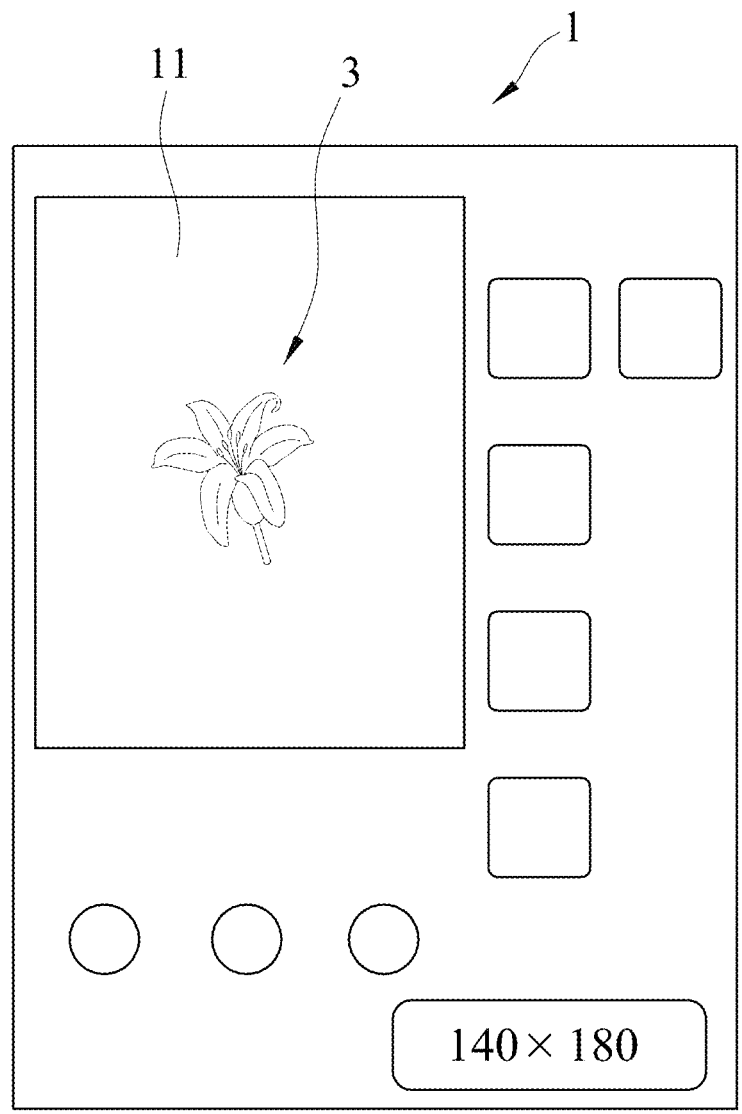
FIG. 3 is a schematic diagram illustrating placement of an image of a desired embroidery object in a graphical editing interface that corresponds to the embroidery area.
Figure 4:
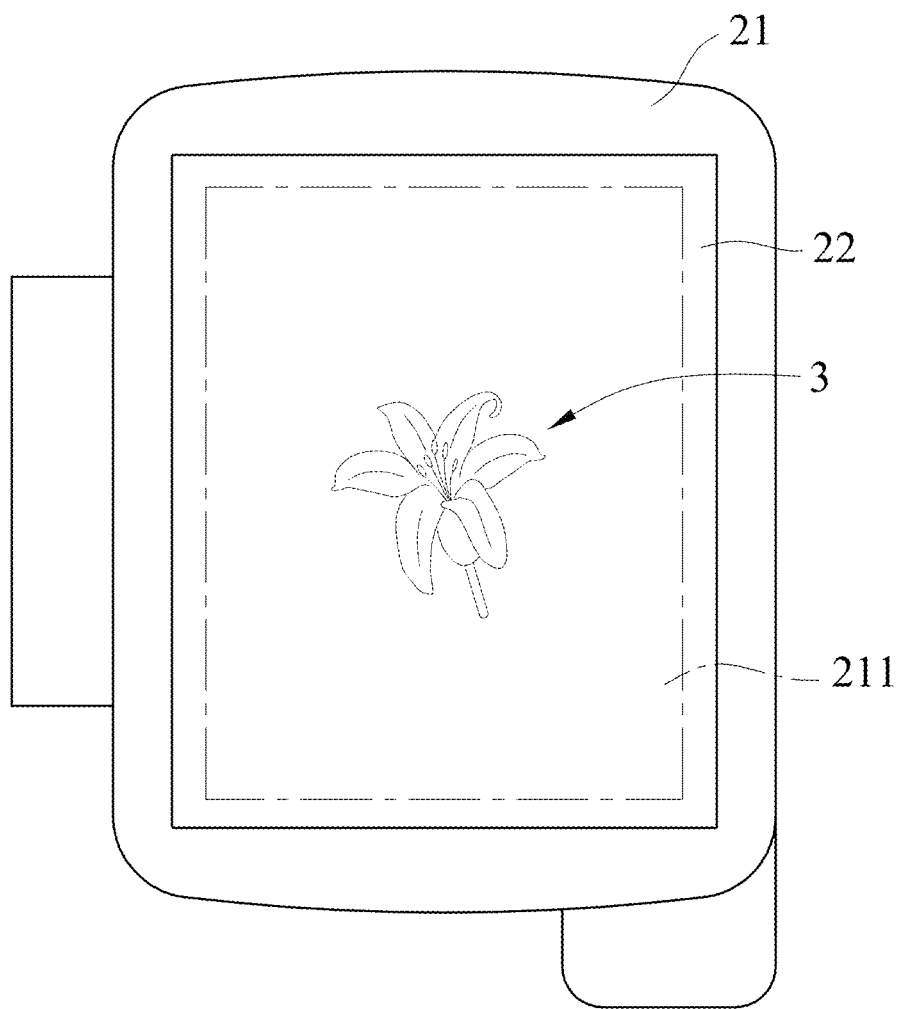
FIG. 4 is a schematic diagram illustrating that a computerized embroidery machine embroiders the desired embroidery object onto a base fabric piece framed in the embroidery frame.

Before the disclosure is described in greater detail, it should be noted that where considered appropriate, reference numerals or terminal portions of reference numerals have been repeated among the figures to indicate corresponding or analogous elements, which may optionally have similar characteristics.

The embodiment of the method of generating an image that shows an embroidery area defined by an embroidery frame for a conventional computerized embroidery machine to perform computerized machine embroidery is implemented by an embroidery system that includes an embroidery frame, a computer device, the conventional computerized embroidery machine and a camera device. The embroidery frame defines an embroidery area, which is exemplified to be of a rectangle that is 140 mm in width and 180 mm in length. The computer device may be a desktop computer, a laptop computer, a tablet computer, etc., and the camera device is made to be a camera box in this embodiment, but this disclosure is not limited in this respect.

Figure 5:
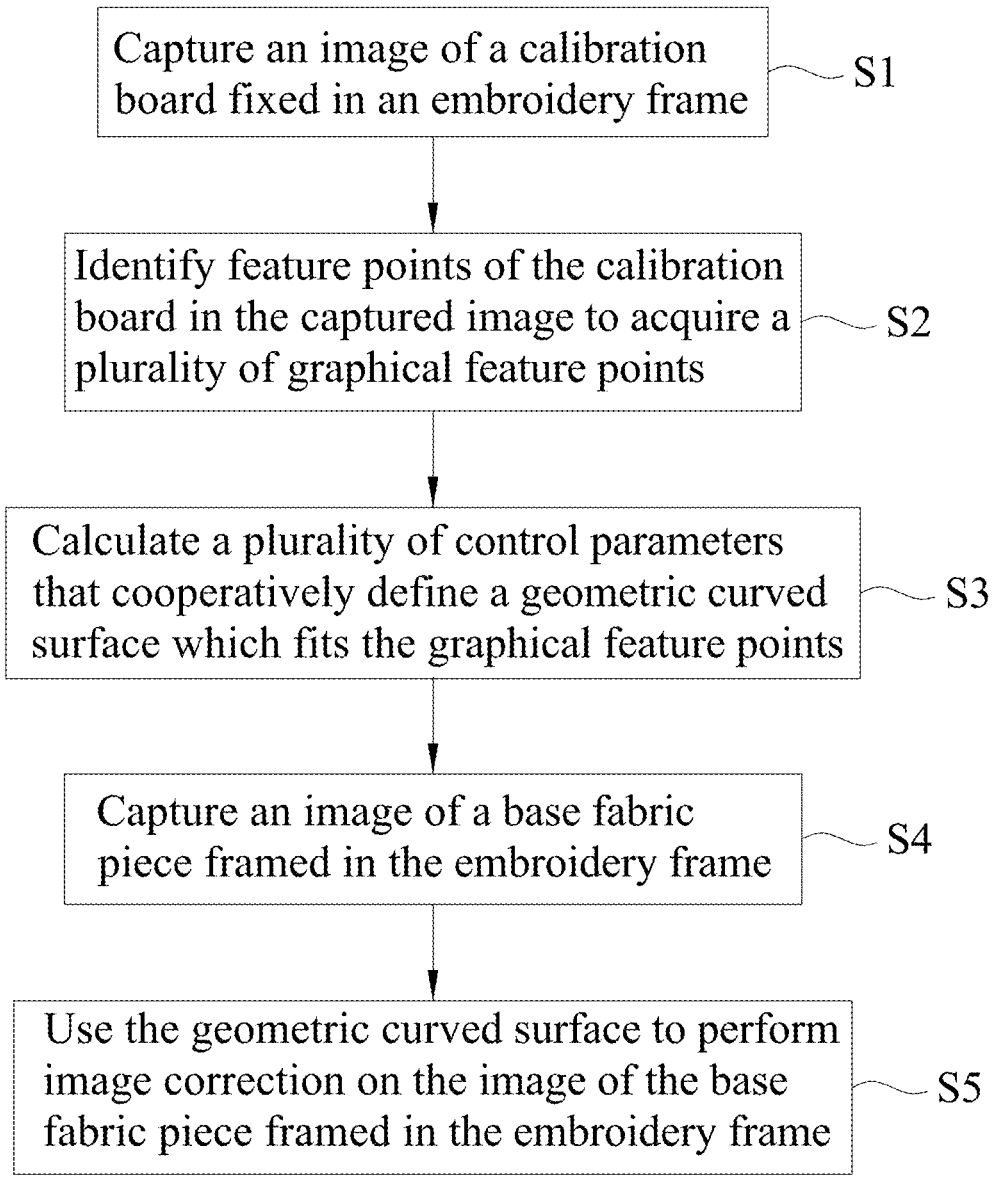
FIG. 5 is a flow chart illustrating steps of an embodiment of the method of generating an image that shows an embroidery area in an embroidery frame for computerized embroidery according to this disclosure.
Figure 6:
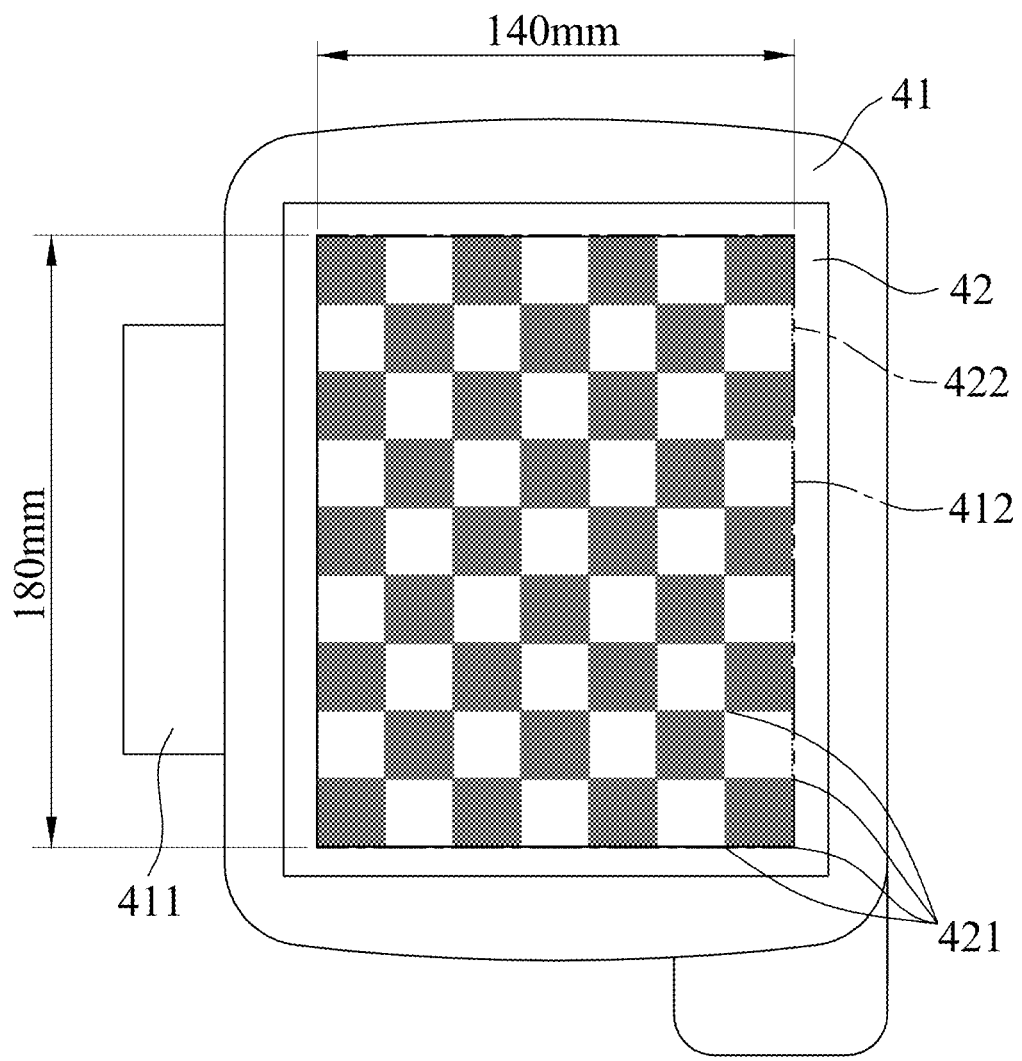
FIG. 6 is a schematic diagram illustrating a calibration board fixed in the embroidery frame.
Figure 7:
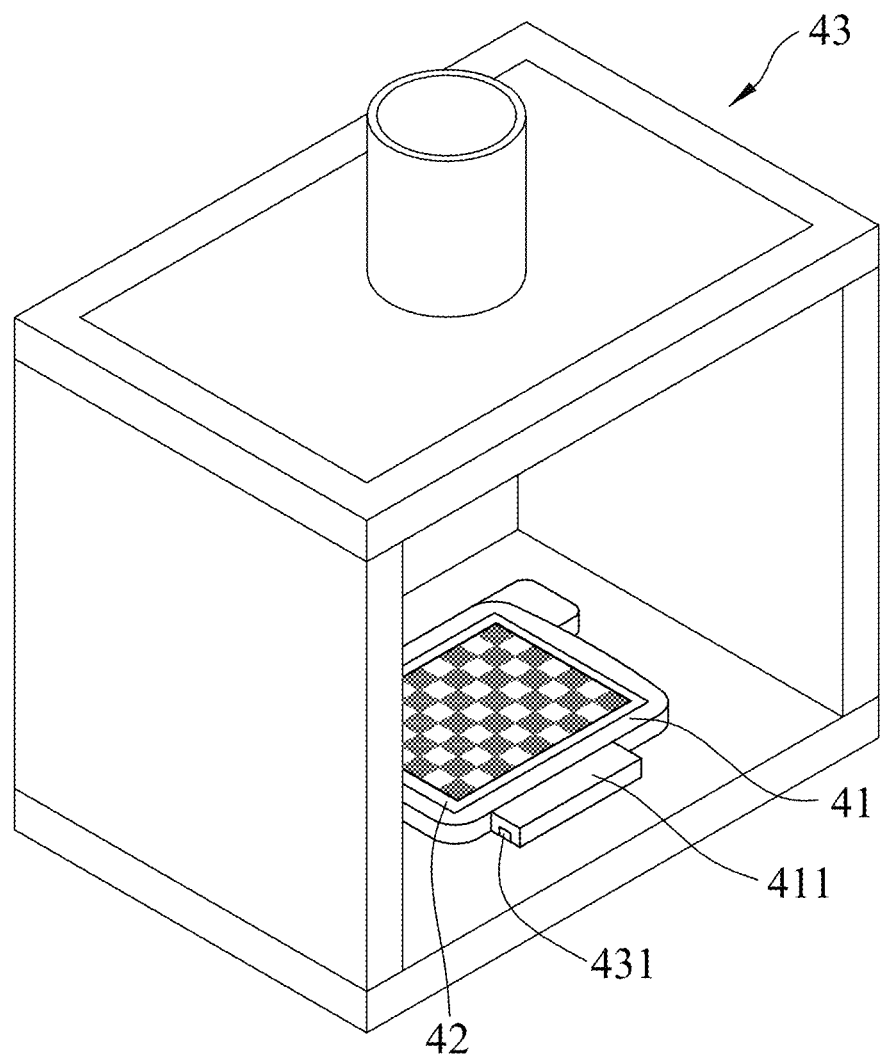
FIG. 7 is a schematic diagram illustrating that a camera box is used to capture an image of the calibration board.
Figure 8:
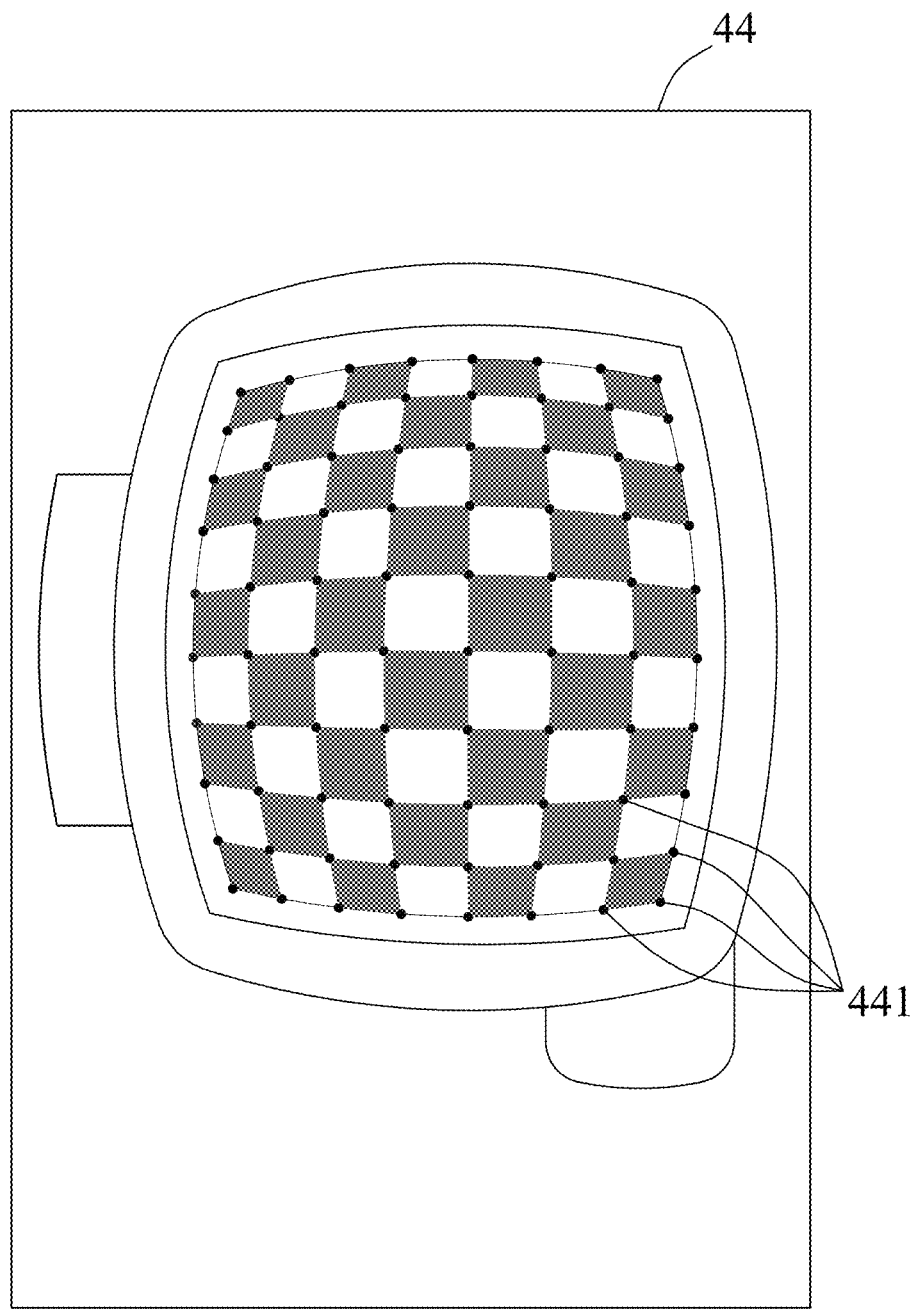
FIG. 8 is a schematic diagram illustrating a plurality of corner points in the image of the calibration board captured using the camera box.

Referring to FIG. 5, the embodiment includes steps S1 to S5. Further referring to FIGS. 6 and 7, in step S1, a calibration board 42 is fixed to the embroidery frame 41, and the embroidery frame 41 is secured in the camera box 43 by engaging a first engaging structure 411 of the embroidery frame 41 with a second engaging structure 431 of the camera box 43. Then, the camera box 43 which may have a fisheye lens is used to capture an image 44 of the calibration board 42, as shown in FIG. 8. In this embodiment, the calibration board 42 is a checkerboard, but this disclosure is not limited in this respect. The calibration board 42 has a plurality of feature points which are respectively corner points 421 in the pattern (e.g., checkers) of the calibration board 42, and a contour formed collectively by the corner points 421 is a rectangle that has a width and a length same as those of the embroidery area 412. It is noted that although the embroidery area 412 of the embroidery frame 41 is exemplified as 140 mm×180 mm in size in this embodiment, this disclosure is not limited in this respect. The embroidery area 412 of the embroidery frame 41 may be of other sizes, such as 50 mm×70 mm, while the calibration board 42 should be designed based on the embroidery area 412 of the embroidery frame 41, such that the contour formed by the feature points approximates that of the embroidery area 412.

Figure 22:
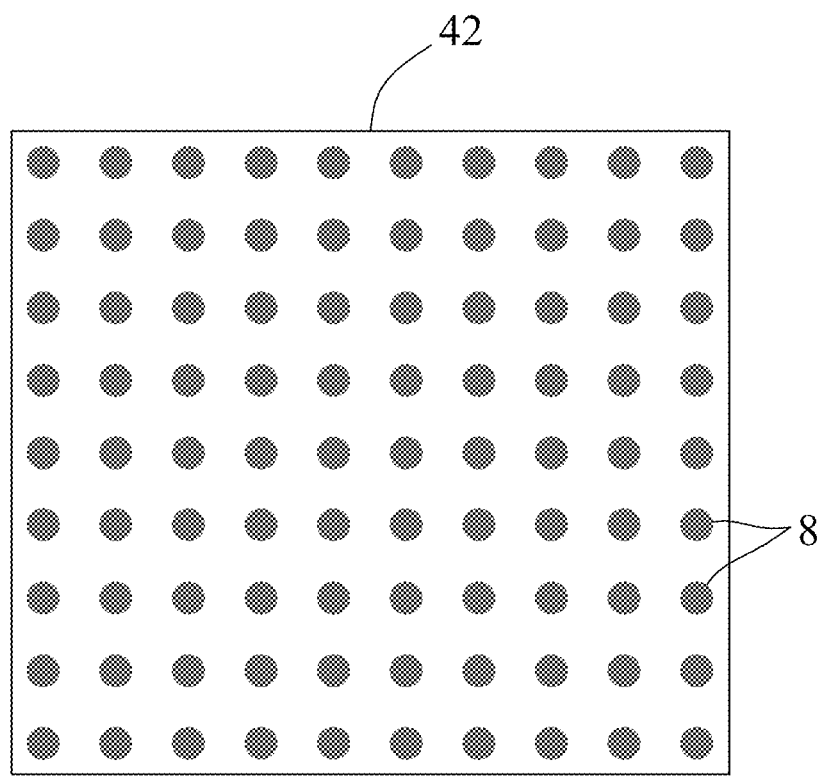
FIG. 22 is a schematic diagram illustrating another calibration board.

In step S2, the computer device identifies the feature points 421 of the calibration board 42 in the image 44 to acquire a plurality of graphical feature points 441 in the image 44. In one example, as shown in FIG. 8, the computer device uses the Harris corner detection technique to identify/recognize the graphical feature points 441 in the image 44 of the calibration board 42 in the form of floating points. In one embodiment, the calibration board 42 may be of other types such as being patterned with regularly spaced dots 8, as shown in FIG. 22, and the computer device may acquire a center of each dot to serve as the graphical feature points by image recognition techniques.

Figure 9:
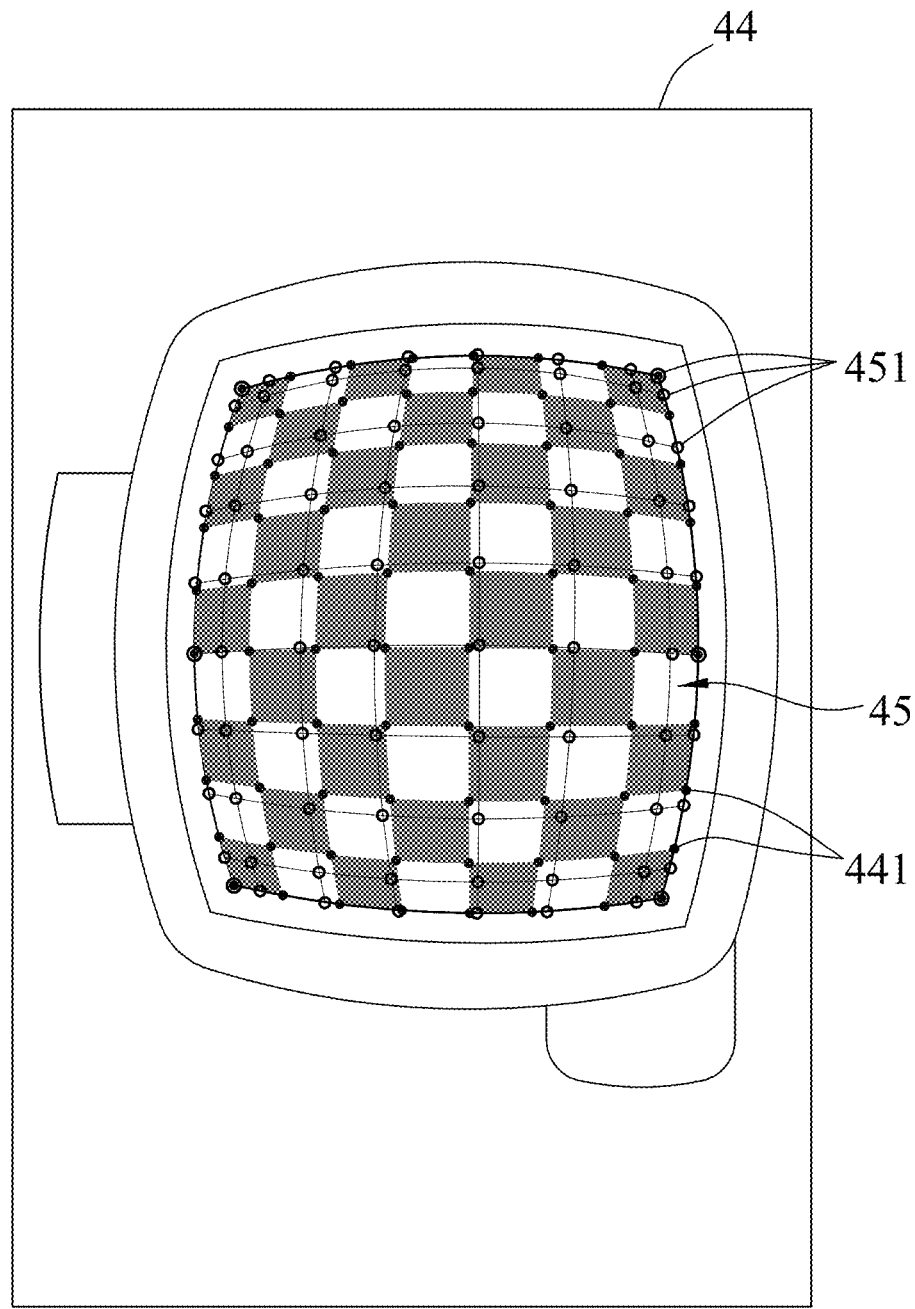
FIG. 9 is a schematic diagram illustrating a parametric non-uniform rational B-splines surface with a plurality of control points thereof, which are evaluated from the corner points.

In step S3, referring to FIG. 9, the computer device calculates/evaluates a plurality of control parameters (i.e., control points 451) that cooperatively define a geometric curved surface which fits the graphical feature points 441. In this embodiment, the geometric curved surface is a parametric non-uniform rational B-splines (NURBS) surface 45, which is obtained by parametric NURBS surface interpolation where the graphical feature points 441 are used as interpolation points for evaluating the parametric NURBS surface 45 that fits the graphical feature points 441 and that is defined by:

$$S(u,v) = \frac{\sum_{i=0}^{m}\sum_{j=0}^{n} w_{i,j} P_{i,j} N_{i,p}(u) N_{j,q}(v)}{\sum_{i=0}^{m}\sum_{j=0}^{n} w_{i,j} N_{i,p}(u) N_{j,q}(v)},$$

where S(u,v) represents the parametric NURBS surface defined by (m+1)×(n+1) control parameters (graphical feature points 441), m and n are user-defined positive integers, $\{w_{i,j}\}$ represents a set of weighted values, $\{P_{1,j}\}$ represents a set of the control points 451 that are calculated using the graphical feature points 441, $N_{i,p}(u)$ represents a normalized B-spline basis function defined on non-periodic knot vectors U={0, 0, . . . , 0, $u_{p+1}$, . . . , $u_m$, 1, 1, . . . , 1}, $N_{j,q}(V)$ represents a normalized B-spline basis function defined on non-periodic knot vectors V={0, 0, . . . , 0, $v_{q+1}$, . . . , $v_n$, 1, 1, . . . , 1}, p represents a degree in a direction of the knot vectors U (i.e., an axial direction of a u-axis of a domain 49 (see FIG. 14) of the parametric NURBS surface 45), and q represents a degree in a direction of the knot vectors V (i.e., an axial direction of a v-axis of the domain 49 of the parametric NURBS surface 45). Note that u belongs to [0, 1] and v belongs to [0, 1].

Figure 10:
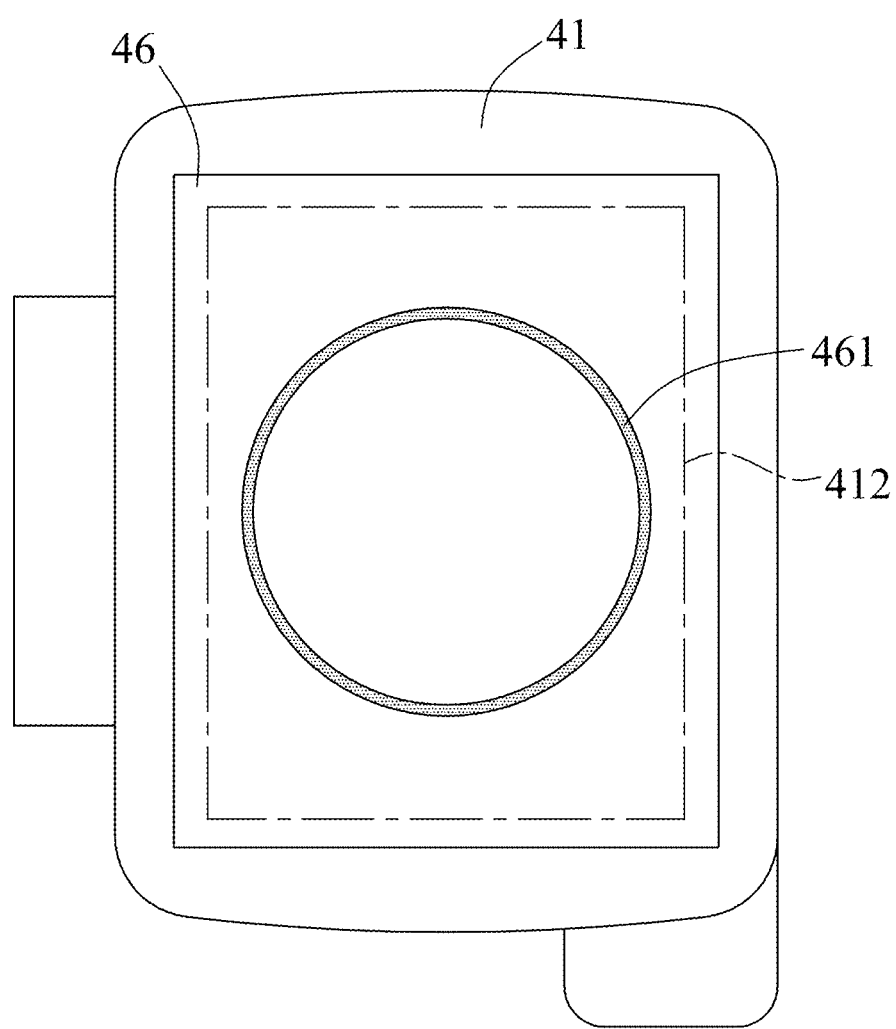
FIG. 10 is a schematic diagram illustrating that the embroidery frame frames a base fabric piece having a pattern of a circular ring.
Figure 11:
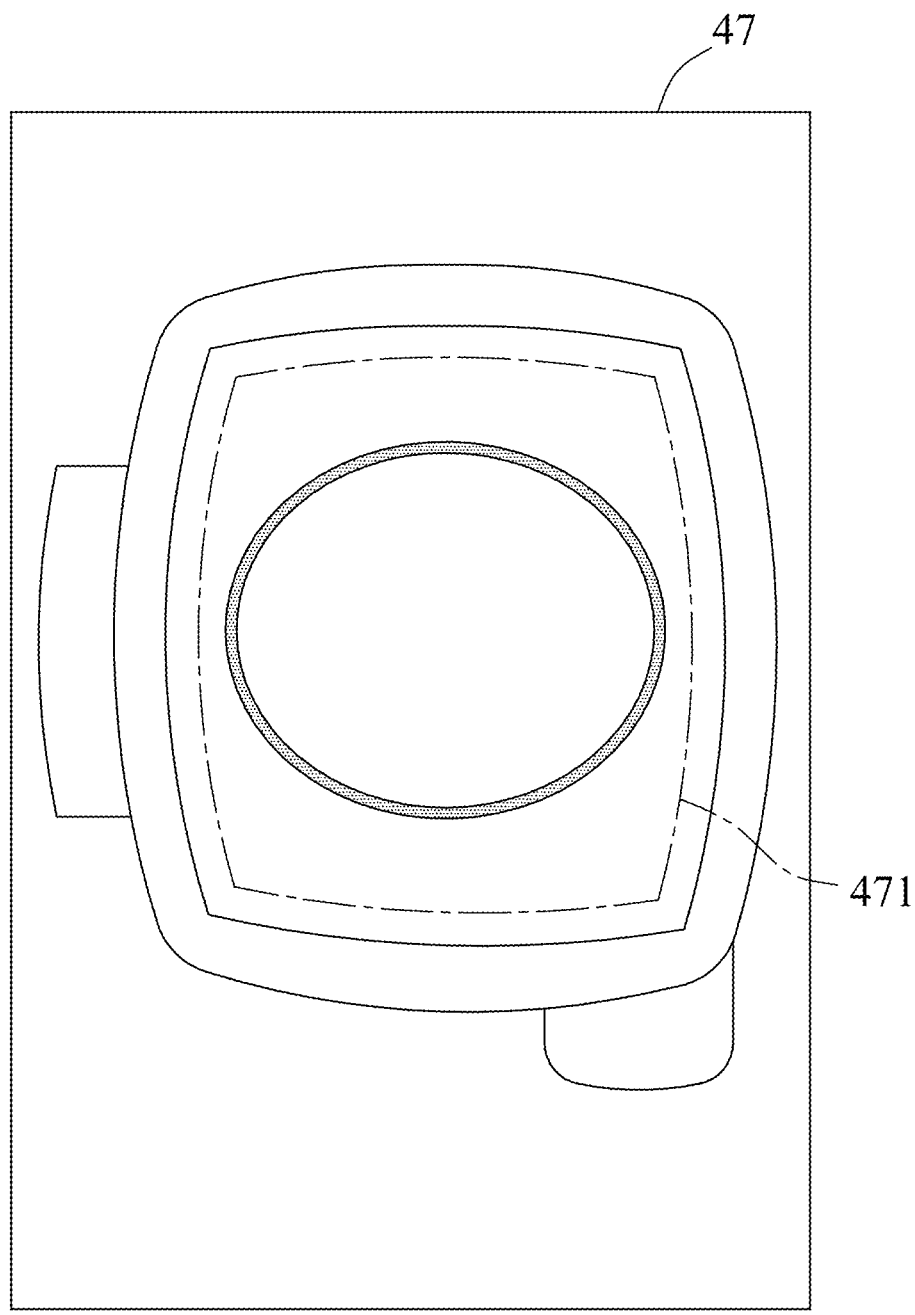
FIG. 11 is a schematic diagram illustrating an image of the embroidery frame framing the base fabric piece.
Figure 12:
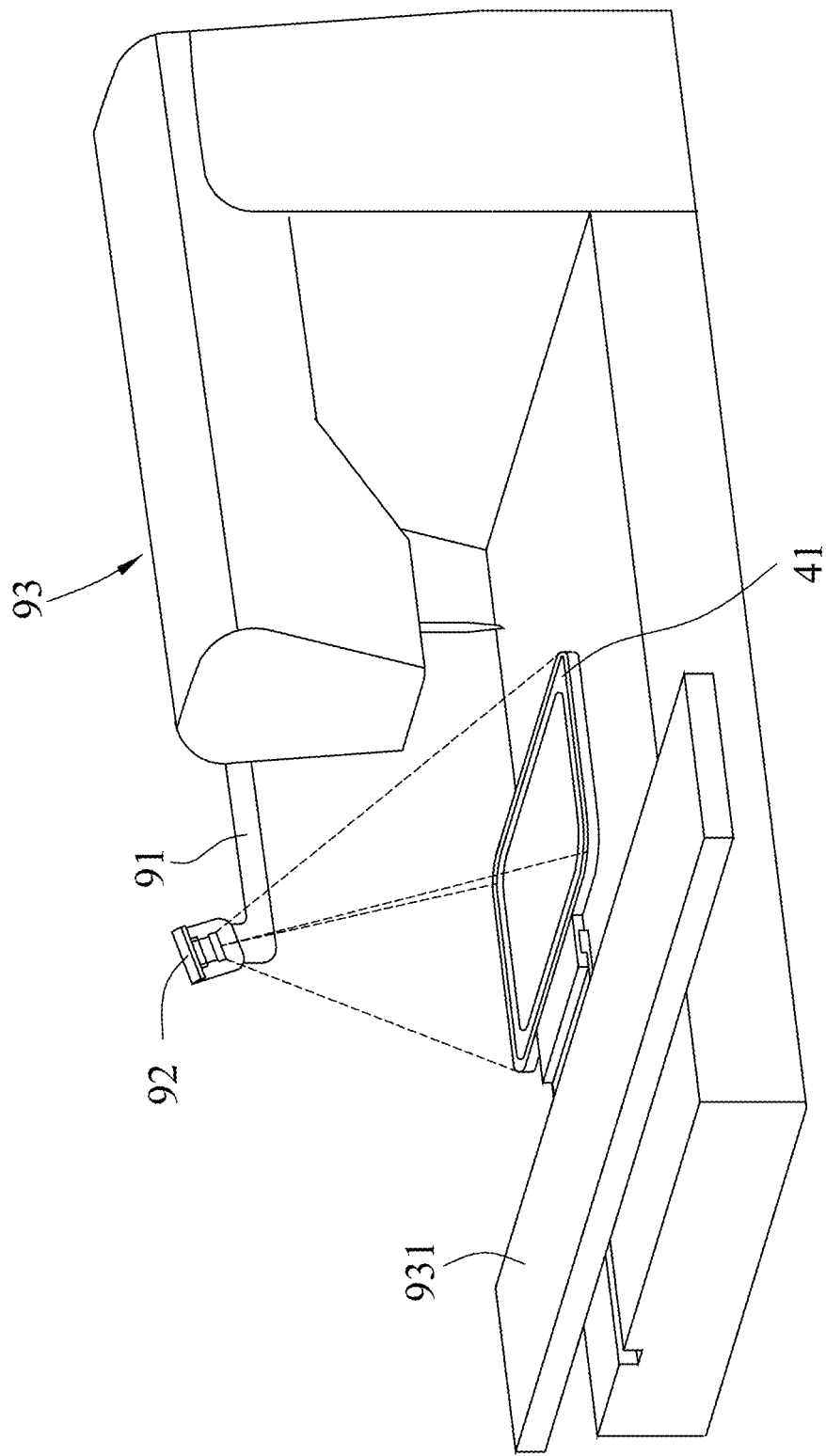
FIG. 12 is a perspective view illustrating another way of capturing images for implementing the method of this disclosure.

In step S4, as shown in FIG. 10, a base fabric piece 46 which is exemplified to have a pattern of a circular ring 461 is fixed/framed in the embroidery frame 41 such that the circular ring 461 is disposed in the embroidery area 412 defined by the embroidery frame 41. Then, the camera box 43 is used to capture an image 47 of the base fabric piece 46 that is framed in the embroidery frame 41, as shown in FIG. 11. It is noted that the capturing of the image 44 of the calibration board 42 and the image 47 of the base fabric piece 46 is not limited to using the camera box 43, as long as a full view of the embroidery area 412 (or, the entire embroidery frame 41) can be captured and the images 44, 47 can be captured at the same position and from the same angle. For instance, as shown in FIG. 12, capturing of the images 44, 47 may be implemented by installing a bracket 91 on the computerized embroidery machine 93, mounting a camera 92 to the bracket 91, and connecting the embroidery frame 41 to a moving mechanism 931 of the computerized embroidery machine 93 that can bring the embroidery frame 41 into movement during embroidering.

In step S5, the computer device uses the parametric NURBS surface 45 to perform image correction on the image 47 so as to generate a corrected image in which an embroidery area defined by the embroidery frame in the corrected image corresponds to the actual embroidery area 412.

Figure 13:
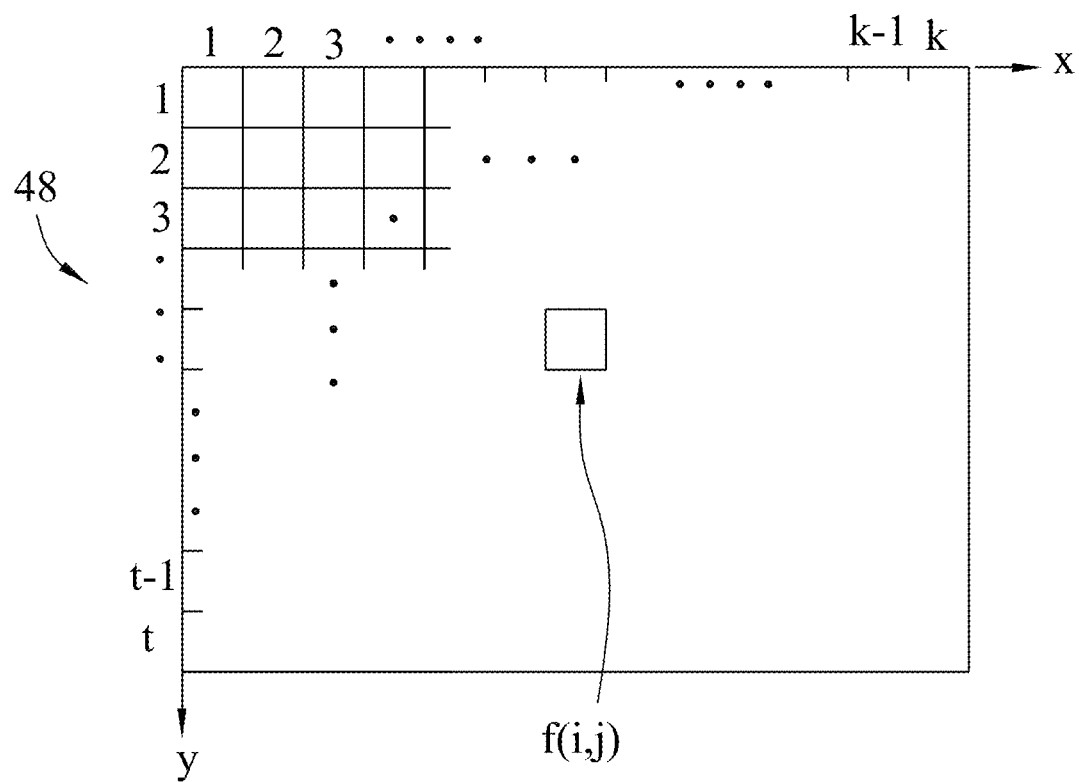
FIG. 13 is a schematic diagram illustrating defining a number of pixels of a corrected image.

Referring to FIG. 13, for the corrected image 48, a first pixel number (k) along a first image axis (e.g., an x-axis) of the corrected image 48, and a second pixel number (t) along a second image axis that is transverse to the first image axis (e.g., a y-axis) of the corrected image 48 are defined first. In other words, a size/resolution of the corrected image 48 can be set/defined as desired in this correction algorithm. Since the embroidery area 412 is 140 mm×180 mm in size for this embodiment, i.e., a width-to-length ratio of the embroidery area 412 is 7:9, a ratio of the first pixel number (k) to the second pixel number (t) should be approximately 7:9 as well.

Figure 14:
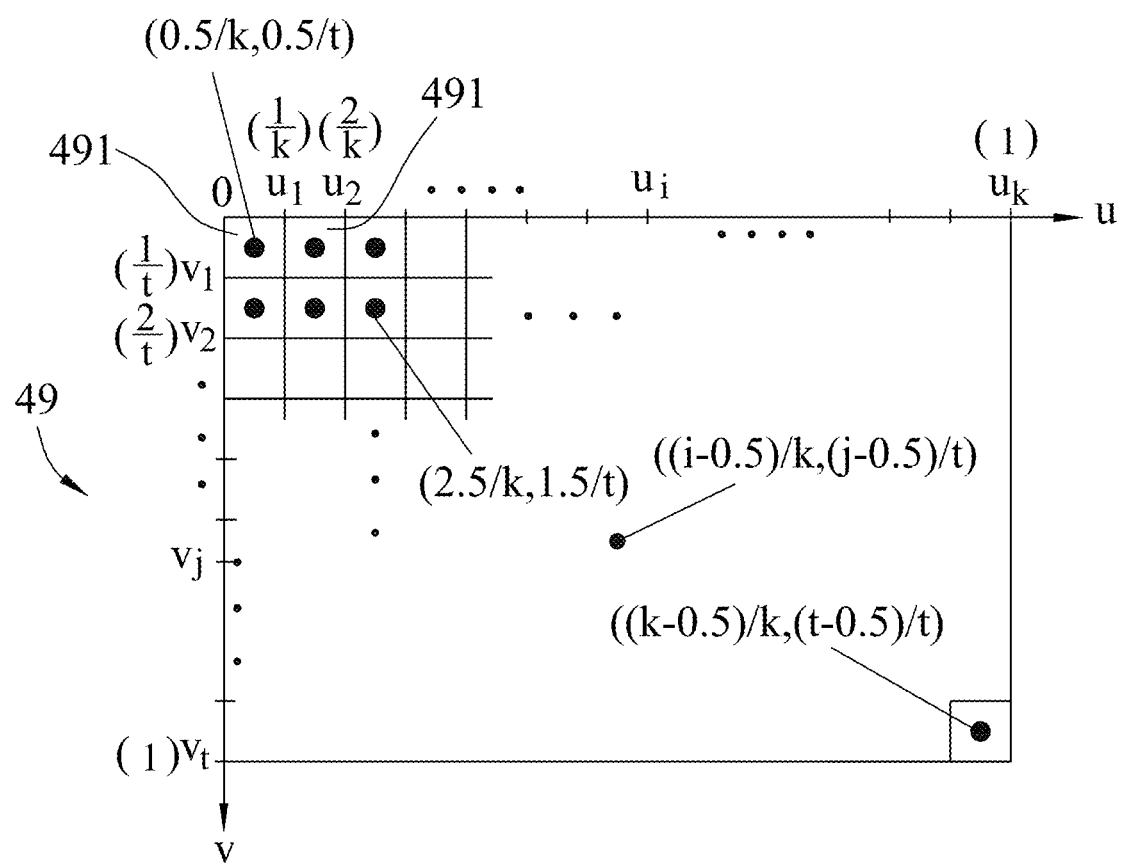
FIG. 14 is a schematic diagram illustrating a domain of the parametric non-uniform rational B-splines surface.
Figure 15:
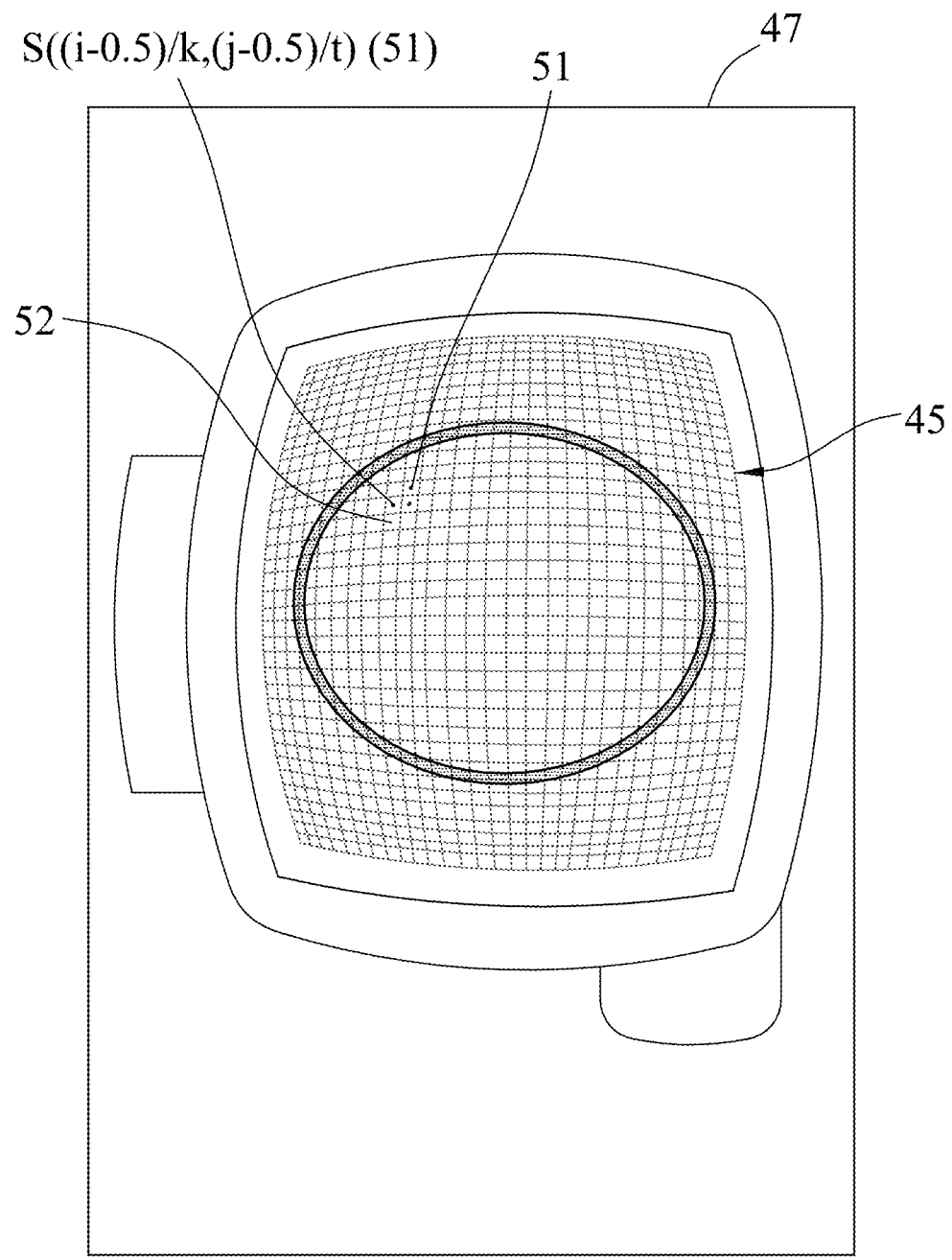
FIG. 15 is a schematic diagram cooperating with FIGS. 13 and 14 to illustrate acquiring pixel values of the pixels of the corrected image.

Further referring to FIGS. 14 and 15, the first pixel number (k) of first sample points $\{u_i|i=1, 2, \ldots, k\}$, and the second pixel number (t) of second sample points $\{v_j|j=1, 2, \ldots, t\}$ are defined respectively on the u-axis and the v-axis in the domain 49 of the parametric NURBS surface 45. The first and second sample points cooperatively define, on the parametric NURBS surface 45, a plurality of curved surface points (the black dots in FIG. 14) each corresponding to a respective one of pixels of the corrected image 48. In this embodiment, the first sample points equally divide the range between 0 and 1 on the u-axis, i.e., a distance between any two adjacent first sampling points is 1/k; the second sample points equally divide the range between 0 and 1 on the v-axis, i.e., a distance between any two adjacent second sampling points is 1/t; and coordinates $(u_i, v_j)$ in the domain 49 correspond to a curved surface point $S((i-0.5)/k, (j-0.5)/t)$ on the parametric NURBS surface 45. In other words, if $f(i,j)$ is used to represent an $(i,j)^{th}$ pixel of the corrected image 48 (a pixel at the $i^{th}$ column and the $j^{th}$ row of a pixel array of the corrected image 48), $f(i,j)$ corresponds to $(u_i, v_j)$ and the curved surface point $S((i-0.5)/k, (j-0.5)/t)$, where i is a positive integer between 1 and k (including 1 and k), and j is a positive integer between 1 and t (including 1 and t). As shown in FIG. 14, the domain 49 is divided into a plurality of identical rectangular or square boxes 491 of which a number is the same as a total number of pixels of the corrected image 48. Each box 491 corresponds to a respective one of the pixels of the corrected image 48, and has a central point that corresponds to a respective one of the curved surface points on the parametric NURBS surface 45. Accordingly, each pixel of the corrected image 48 corresponds to a respective one of the curved surface points that corresponds to the central point of the corresponding box 491. Each box 491 in the domain 49 corresponds to a polygon region 52 of the parametric NURBS surface 45, and each polygon region 52 contains a curved surface point 51 that corresponds to a pixel of the corrected image 48.

Then, a pixel value of the pixel $f(i,j)$ of the corrected image 48 may be calculated by performing interpolation (e.g., nearest neighbor interpolation, bilinear interpolation, etc.) based on at least a pixel of the image 47 that is adjacent to a position corresponding to one of the curved surface points 51 which corresponds to the pixel $f(i,j)$ (the position on the image 47 that aligns with the corresponding curved surface point 51 when the parametric NURBS surface 45 coincides with the calibration board 42 in the image 47). For instance, in FIG. 15, the parametric NURBS surface 45 coincides with the calibration board 42 (see FIG. 6) in the image 47, and the pixel value of a pixel $f(5,6)$ of the corrected image 48 (see FIG. 13) can be calculated based on at least one pixel of the image 47 that is adjacent to a curved surface point 51 $S(4.5/k, 5.5/t)$ in correspondence to the coordinates $(u_5, v_6)$ in the domain 49 (see FIG. 14) of the parametric NURBS surface 45.

Figure 16:
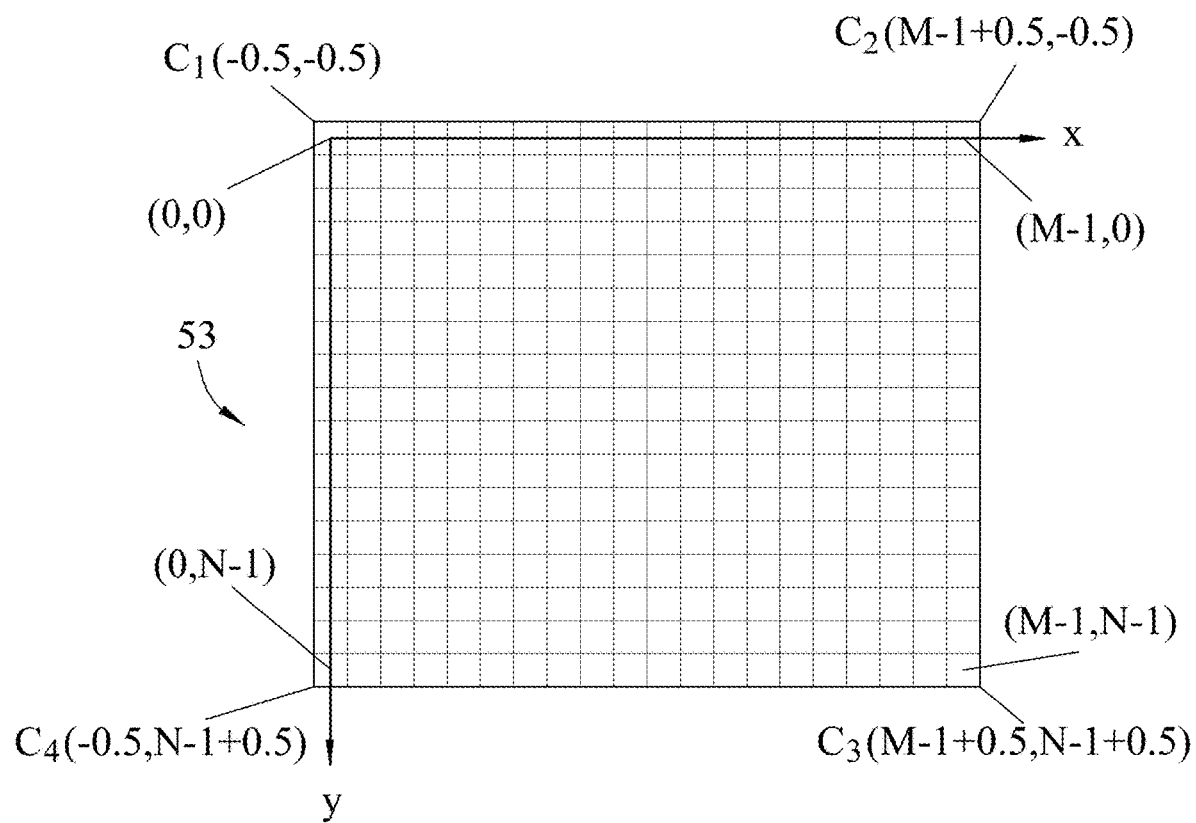
FIG. 16 is a schematic diagram illustrating a coordinate plane that is required to be covered by an image coordinate system corresponding to the image of the embroidery frame that frames the base fabric piece.

Referring to FIG. 16, since each curved surface point is represented as a floating point, an image coordinate system that corresponds to the image 47 should cover a coordinate plane 53 defined by four terminal points: $C_1(-0.5,-0.5)$, $C_2(M-1+0.5,-0.5)$, $C_3(M-1+0.5, N-1+0.5)$ and $C_4$ $(-0.5, N-1+0.5)$ when the image 47 has a number (M×N) of pixels, so as to cover the curved surface points disposed at borders of the parametric NURBS surface 45. The $(i,j)^{th}$ pixel of the image 47 has a central point of which the coordinates are $(i-1, j-1)$ in the image coordinate system, where i is a positive integer between 1 and M (including 1 and M), and j is a positive integer between 1 and N (including 1 and N).

Figure 17:
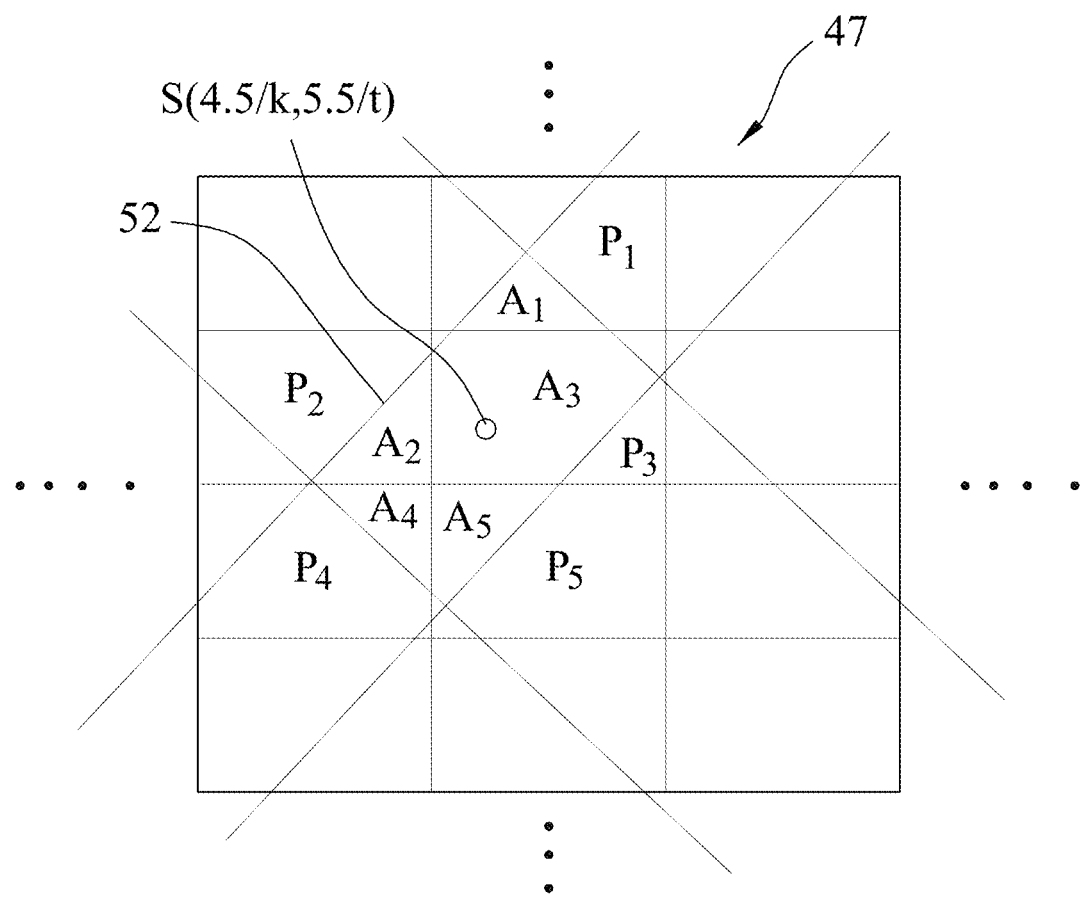
FIG. 17 is a schematic diagram illustrating another implementation for calculating the pixel values of the pixels of the corrected image.

Referring to FIG. 17, in another implementation, the pixel value of the pixel $f(i,j)$ (e.g., $f(5,6)$) of the corrected image 48 may be calculated by performing interpolation based on a weighted mean of the pixels of the image 47 overlapping the polygon region 52 of the parametric NURBS surface 45 which contains the point $((i-0.5)/k,(j-0.5)/t)$ (e.g., the point $S(4.5/k, 5.5/t)$ in FIG. 17). Each pixel of the image 47 has a weight being a ratio of an area of the pixel that overlaps the polygon region 52. For instance, in FIG. 17, the polygon area 52 overlaps the pixels $P_1$ to $P_5$ of the image 47 by areas of $A_1, A_2, A_3, A_4$ and $A_5$, respectively. Making $$V = \sum_{i=1}^{5} A_i,$$

and the weighted mean can be represented by $$\sum_{i=1}^{5} \left(\frac{A_i}{V} \times p_i\right),$$

where $p_i$ represents a pixel value of the pixel $P_i$ of the image 47, and $A_i/V$ is the weight for the pixel $P_i$. In yet another implementation, the weight for the pixel Pi of the image 47 may be defined based on a distance between a center of the pixel $P_i$ and the point $((i-0.5)/k,(j-0.5)/t)$ in the image 47, where the shorter the distance, the greater the weight.

Figure 18:
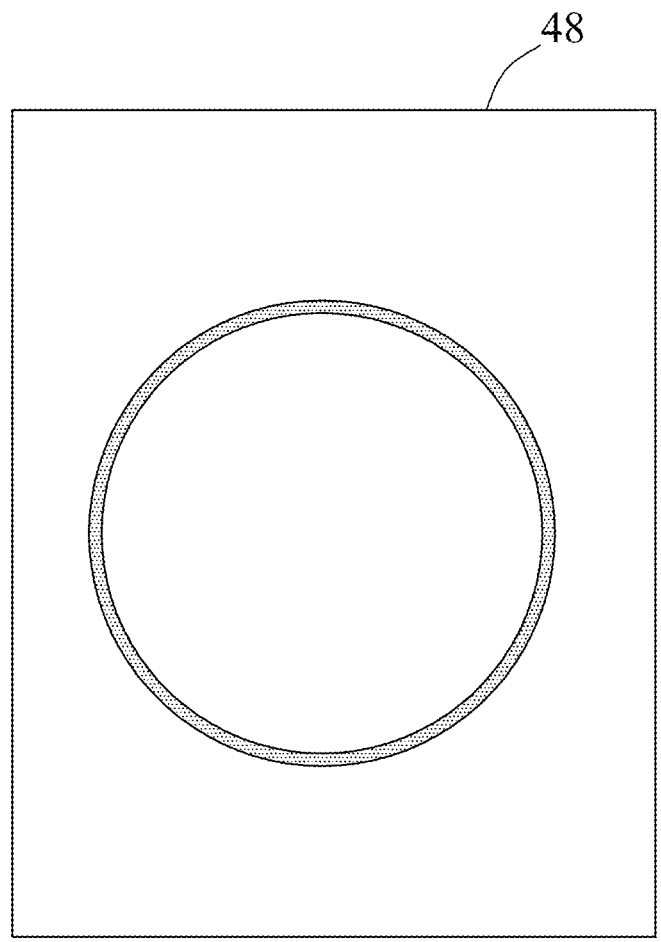
FIG. 18 is a schematic diagram exemplarily illustrating a corrected image of the image of the embroidery frame that frames the base fabric piece.
Figure 19:
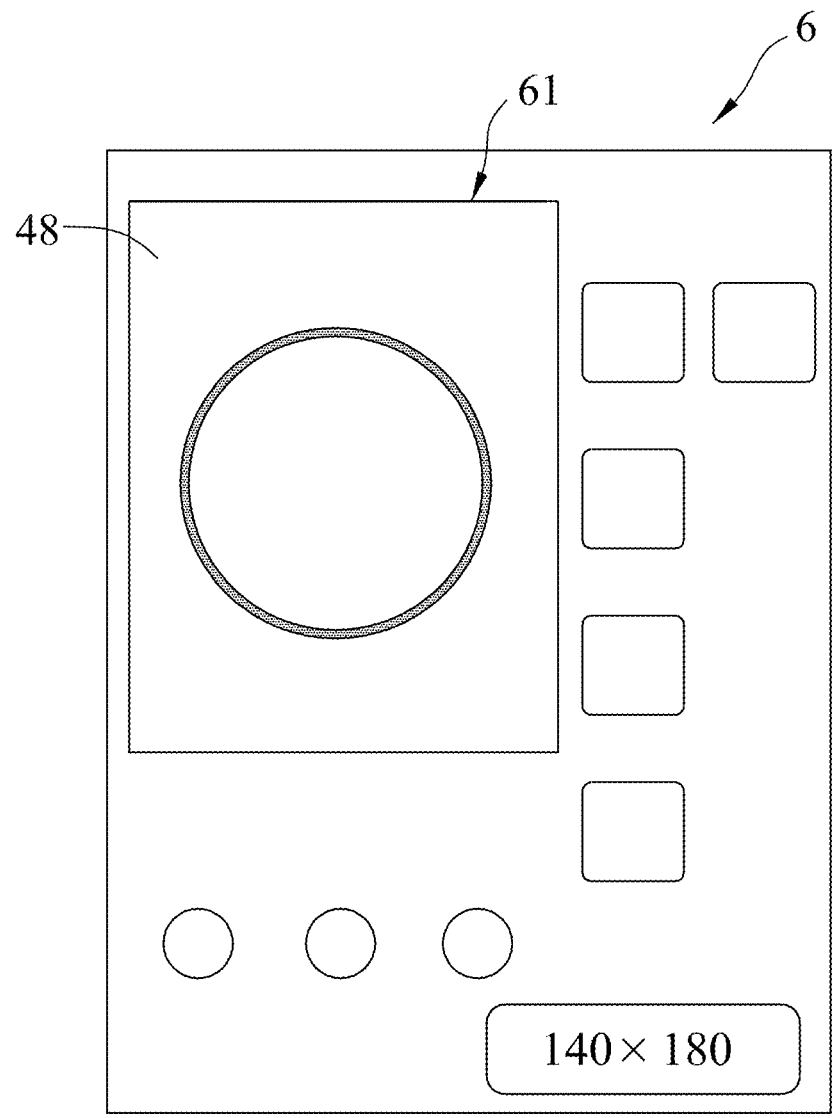
FIG. 19 is a schematic diagram illustrating that the corrected image is used as a background of the graphical editing interface of the editing program for computerized machine embroidery.
Figure 20:
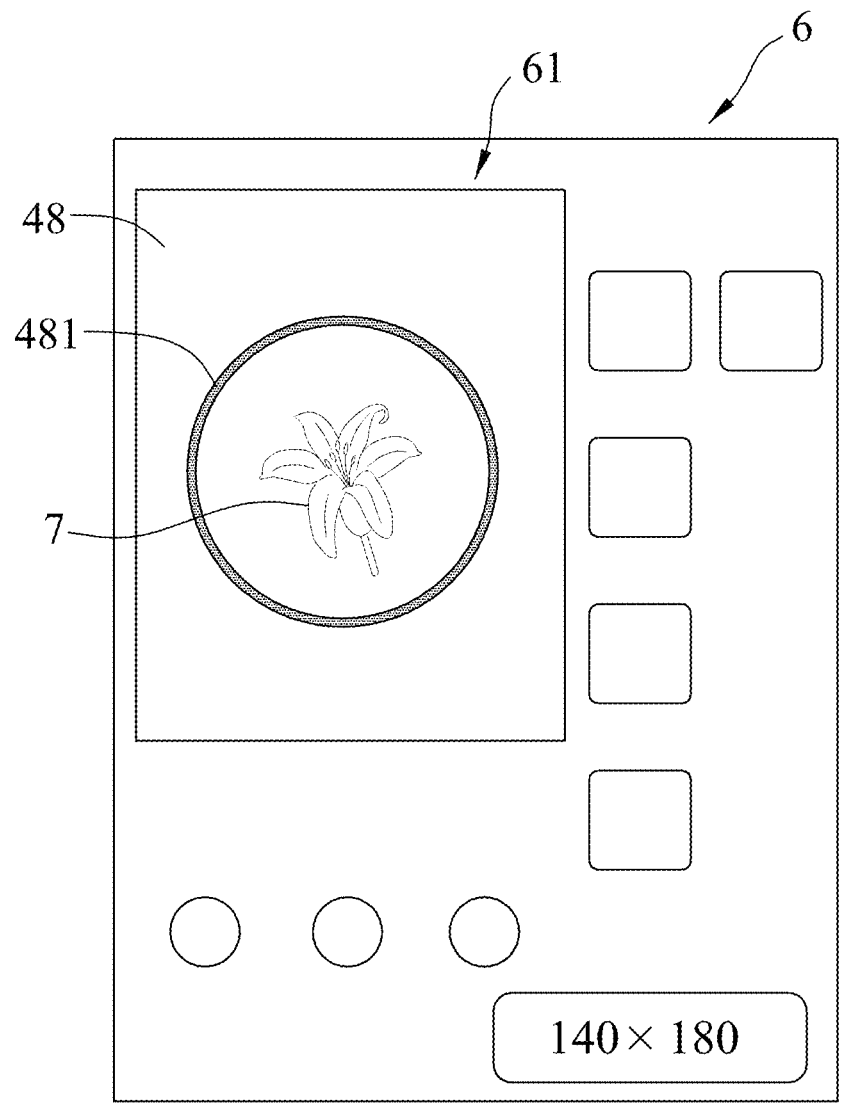
FIG. 20 is a schematic diagram illustrating placement of an image of a desired embroidery object at a location with respect to a circular ring pattern that corresponds to the pattern of the base fabric piece in the graphical editing interface.
Figure 21:
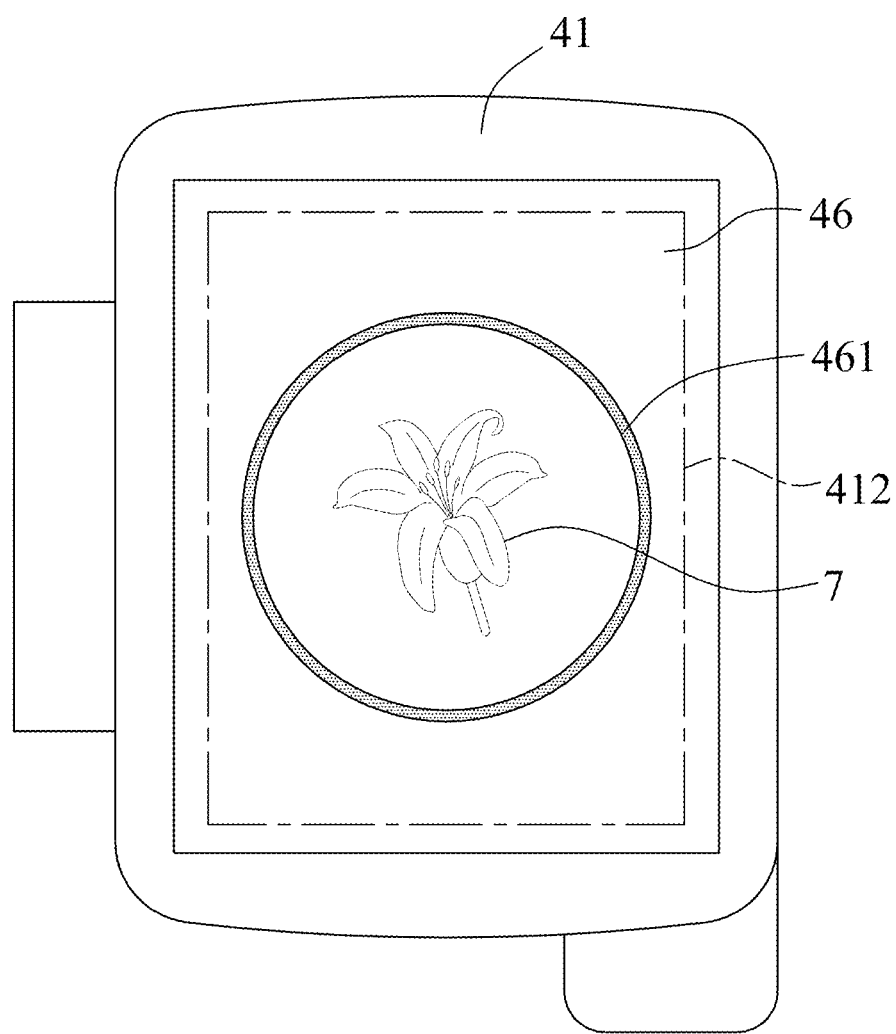
FIG. 21 is a schematic diagram illustrating that a computerized embroidery machine embroiders the desired embroidery object onto the base fabric piece framed in the embroidery frame according to an editing result as shown in the graphical editing interface.

FIG. 18 illustrated a corrected image 48 that is acquired by performing the abovementioned image correction on the image 47 and that is modified to include only an image part that corresponds to the embroidery area 412 of the embroidery frame 41 that frames the base fabric piece 46 (see FIG. 10), i.e., an image part 471 of the image 47 in FIG. 11. Since the aforementioned image correction algorithm is based on a capturing result of a camera, distortions resulting from, for instance, geometric design of the camera lens, lens deformation during manufacturing, imprecision of lens assembly, and/or imprecision of placement of the image sensor, can all be alleviated or corrected by the image correction algorithm. In addition, deformation of the captured image which results from the captured object itself in the physical world (for example, a to-be-captured soft fabric piece is placed on a curved surface) can also be un-deformed by use of such image correction algorithm. Furthermore, a width-to-length ratio of the corrected image 48 is the ratio of the first pixel number to the second pixel number, which approximates the width-to-length ratio of the actual embroidery area 412 of the embroidery frame 41. In other words, the corrected image 48 corresponds to the actual embroidery area 412 of the embroidery frame 41. Referring to FIG. 19, the corrected image 48 may be used as a background of a graphical editing interface 61 of an editing program 6, so that the user may place an image of a desired embroidery object 7 at a desired location in relation to a circular ring pattern 481 which corresponds to the pattern of the circular ring 461 of the base fabric piece 46, as shown in FIG. 20. In practice, the user may properly adjust a size of the circular ring pattern 481 and correctly place the image of the desired embroidery object 7 within the circular ring pattern 481. After the editing, the user may install the embroidery frame 41 that frames the base fabric piece 46 to the computerized embroidery machine, and cause the computerized embroidery machine to automatically embroider, according to the editing result, the desired embroidery object 7 at the desired location in relation to the pattern of the circular ring 461 on the base fabric piece 46, such that the location of the desired embroidery object 7 with respect to the pattern of the circular ring 461 in the embroidery area 412 is consistent with the location of the image of the desired embroidery object 7 with respect to the circular ring pattern 481 in the graphical editing interface 61.

In summary, the embodiment of the method according to this disclosure is proposed to capture multiple graphical feature points of an image of a calibration board, calculate a parametric NURBS surface, and perform correction on an image of an embroidery frame that frames a base fabric piece using the parametric NURBS surface calculated based on the image of the calibration board, thereby generating a corrected image. The corrected image corresponds to an embroidery area defined by the embroidery frame that frames the base fabric piece, and thus can be used as a background of a graphical user interface of an editing program for computerized machine embroidery.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of generating an image that shows an embroidery area in an embroidery frame for computerized embroidery, said method comprising:
   acquiring a first image of a calibration board, the calibration board having a plurality of feature points that form a contour approximating an embroidery area defined by the embroidery frame;
   identifying the feature points of the calibration board in the first image to acquire a plurality of graphical feature points;
   calculating a plurality of control parameters based on the graphical feature points, the control parameters cooperatively defining a geometric curved surface that fits the graphical feature points and that includes a plurality of curved surface points;
   acquiring a second image in which the embroidery area of the embroidery frame is shown and which includes a plurality of image pixels; and
   performing image correction on the second image based on the geometric curved surface to generate a corrected image;
   wherein the corrected image corresponds to the embroidery area of the embroidery frame, and includes a plurality of pixels respectively corresponding to the curved surface points of the geometric curved surface; and
   wherein, for each of the pixels of the corrected image, a pixel value thereof is calculated based on at least one of the image pixels of the second image that is adjacent to a position corresponding to one of the curved surface points which corresponds to the pixel of the corrected image.

2. The method of claim 1, wherein the geometric curved surface is a parametric non-uniform rational B-splines surface, and the control parameters respectively correspond to a plurality of control points of the parametric non-uniform rational B-splines surface.

3. The method of claim 2, wherein the embroidery area of the embroidery frame is rectangular, and the generating the corrected image includes:
   defining, for the corrected image that has a first image axis and a second image axis transverse to the first image axis, a first pixel number along the first image axis, and a second pixel number along the second image axis, a number of the pixels of the corrected image relating to the first pixel number and the second pixel number, a ratio of the first pixel number to the second pixel number approximating a width-to-length ratio of the embroidery area;
   defining, in a domain of the geometric curved surface, the first pixel number of first sample points on a first domain axis, and the second pixel number of second sample points on a second domain axis that is transverse to the first domain axis, the first sample points and the second sample points cooperatively defining the curved surface points of the geometric curved surface; and
   generating the corrected image based on the curved surface points and the second image.

4. The method of claim 3, wherein any adjacent two of the first sample points have a same distance therebetween on the first domain axis, and any adjacent two of the second sample points have a same distance therebetween on the second domain axis.

5. The method of claim 4, wherein, for each of the pixels of the corrected image, the pixel value thereof is calculated by performing interpolation based on said at least one of the image pixels of the to-be-corrected image.

6. The method of claim 4, wherein, for each of the pixels of the corrected image, the pixel value thereof is calculated by calculating a weighted mean based on said at least one of the image pixels of the to-be-corrected image.

7. The method of claim 1, wherein the calibration board is a checkerboard containing a plurality of corner points, and the acquiring the graphical feature points includes recognizing the corner points to serve as the graphical feature points.

8. The method of claim 1, wherein the calibration board is a dotted board containing a plurality of dots that are spaced apart from each other, and the acquiring the graphical feature points includes recognizing a center of each of the dots to serve as a respective one of the graphical feature points.

* * * * *